_United States Patent Office_

3,366,579
Patented Jan. 30, 1968

3,366,579
CATALYST PREPARATION
Sebastian Marc Laurent, Greenwell Springs, La., assignor to Esso Research and Engineering Company, a corporation of Delaware
No Drawing. Filed May 19, 1965, Ser. No. 457,169
19 Claims. (Cl. 252—455)

ABSTRACT OF THE DISCLOSURE

The present disclosure relates to a method for preparing elemental metal containing crystalline alumino-silicate zeolites. The method involves dry mixing the zeolite with the solid metal catalyst then contacting the admixture with a reactable gas to form a vaporous compound of the metal which is capable of being adsorbed on the exposed surfaces of the zeolite and finally reducing the vaporous compound to the elemental form.

---

This invention relates to a process for preparing catalytic materials comprising crystalline alumino-silicate zeolites having catalytic metals deposited on their exposed surfaces.

Superior hydrocarbon conversion catalysts of recent origin have comprised crystalline alumino-silicate zeolite materials, sometimes referred to as "molecular sieves." For use in hydrocarbon conversion processes, these crystalline zeolites are commonly modified to reduce their alkali metal content by ion exchange with a cation which will not have an inhibiting or poisoning effect. In addition to introduction of a suitable cation or cations, it is customary to deposit an active catalytic metal on the surfaces of the crystalline zeolite, the particular metal chosen depending upon the intended use of the zeolite catalyst. The most common method of introducing a desired catalytic metal is by treating the crystalline zeolite with a solution containing a soluble compound of the desired catalytic metal, which compounds are either exchanged for cations originally in the zeolite structure, or adsorbed by the zeolite, and thereafter subjecting the zeolite to a reducing atmosphere at elevated temperature in order to reduce the catalytic metal to its elemental form.

While such techniques have proved highly satisfactory, there is, of course, the constant need for obtaining catalysts of improved activity and selectivity and for reducing the cost of catalyst manufacture. It has now been found that catalytic metals can be deposited on crystalline alumino-silicate zeolites in a much more economical and efficient manner than heretofore known, while ensuring a uniform distribution of catalytic metal over only those surfaces of the crystalline zeolite that come into contact with the feed stream to be subsequently processed.

In brief compass, the present process comprises (1) physically admixing (a) a crystalline alumino-silicate zeolite which has been base exchanged with a suitable cation to reduce its alkali metal content to a level which is not deleterious to hydrocarbon conversion reactions, with (b) a catalytic metal in an amount desired to be deposited on the zeolite; (2) thereafter treating said admixture at an elevated temperature with a gas reactable with said catalytic metal to form a vaporous compound of said metal capable of being both adsorbed by said zeolite and reduced back to the elemental form of said metal when subjected to a reducing atmosphere; and (3) finally treating said zeolite containing adsorbed catalytic metal compound in a reducing atmosphere. The amount of catalytic metal mixed with the zeolite should be no greater than the amount desired to be ultimately deposited on the catalytic surfaces of the zeolite, so that the catalytic metal will be entirely consumed during treatment with the aforesaid reactive gas in order to obviate the need for separating the final catalyst product from residues of catalytic metal. By mixing the catalytic metal and the crystalline zeolite to form an intimate and essentially uniform admixture, a uniform deposition of the catalytic metal is ensured, as opposed to the situation, for example wherein a carrier gas containing the catalytic metal is passed through a bed of catalyst support. This latter procedure is deficient in its relative inability to uniformly distribute the catalytic metal throughout the bed of catalyst support, thereby leading to inefficient and ineffective utilization of catalytic metal.

Furthermore, the present process also has the advantage over the aforementioned ion exchange followed by reduction technique for incorporating catalytic metals into crystalline zeolites, in that the catalytic metal deposition is performed essentially on only those catalytic surfaces of the crystalline zeolite which are exposed to incoming feed molecules. To better comprehend this advantage, an understanding of the nature of crystalline alumino-silicate zeolites is desirable. These materials are characterized by a crystalline structure containing a large number of cavities, interconnected by a number of channels of uniform size, commonly called the "port openings" of the zeolite. The crystal structure of these zeolitic materials is made up of alkali metal, silicon, aluminum and oxygen atoms in a definite and consistent pattern. Ion exchange of the alkali metal ions originally in the crystalline zeolite structure typically causes these ions to be replaced with the exchanging cation essentially uniformly throughout the crystal structure of the zeolite. Thus, where the catalytic metal is introduced by ion exchange and thereafter reduced to elemental form, the resulting catalyst product contains elemental catalytic metal distributed essentially uniformly, throughout the entire crystal structure. However, since incoming feed molecules substantially contact only the exposed surfaces of the zeolite, a large number of catalytic metal sites are thus inaccessible, and the presence of the catalytic metal at these sites is substantially wasted. It will be readily appreciated that a much more efficient and economical distribution of catalytic metal wherein the latter is present only at the zeolitic surfaces exposed to contact with incoming feed molecules is to be highly desired. By the process of the invention, a superior catalyst is thus prepared which is especially useful for reactions that may be diffusion limited, owing to the fact that only the exposed surfaces in the pore openings of the zeolite are laden with the catalytic metal, whereas the innermost regions of the zeolite per se wherein reaction is unlikely are relatively free of catalytic metal. This is due to the fact that the carrier gas deposits the metal on the first surfaces with which it comes into contact, these surfaces being the inner walls of the zeolite pore openings.

In addition to the above advantages, it will be readily observed that use of the present process will avoid the customary cation exchange treatment employed in the preparation of zeolite catalysts, thereby eliminating costly manufacturing steps, large volumes of water resulting therefrom, etc. The process of the present invention involves an essentially dry technique by causing the direct transfer of catalytic metal to the zeolite surfaces. Furthermore, the present invention provides a means for dispersing a catalytically active metal onto the surfaces of a crystalline alumino-silicate zeolite which are exposed to incoming feed molecules in the form of extremely fine particles that are uniformly distributed as a layer of perhaps one or more molecules thick.

Crystalline alumino-silicate zeolites are now well known. The various types may be classified according to the size of the molecules which will be rejected (i.e. not adsorbed) by a particular zeolite. In general, the crystalline alumino-silicate zeolites within the purview of the present invention may be represented by the following formula, expressed in terms of moles:

$$0.9 \pm 0.2 M_{2/n}O : Al_2O_3 : X SiO_2$$

wherein M is selected from the group consisting of metal cations and hydrogen, $n$ is its valence, and X is a number from about 1.5 to about 12. The value of X will vary with the particular zeolite in question. Among the well-known natural zeolites are mordenite, faujasite, chabazite, gmelinite, analcite, erionite, etc. Such zeolites differ in structure, composition, and particularly in the ratio of silica to alumina contained in the crystal lattice structure; e.g. mordenite, having a ratio of about 8 to about 12; faujasite, having a ratio of about 2.5 to about 7; etc. Similarly, the various types of synthetic crystalline zeolites, e.g. faujasite, mordenite, etc., will also have varying silica to alumina ratios depending upon such variables as composition of crystallization mixture, reaction conditions, etc. A number of synthetic zeolites have been described in the patent literature, and have been designated by various letters of the alphabet, e.g. A, X, Y, etc.

The processes for producing such crystalline synthetic zeolites are well known in the art. Typically, they involve crystallization from reaction mixtures containing: $Al_2O_3$ as sodium aluminate, alumina sol and the like; $SiO_2$ as sodium silicate and/or silica gel and/or silica sol; alkali metal oxide, e.g. sodium hydroxide, either free or in combination with the above components; and water. Careful control is kept over the alkali metal oxide concentration of the mixture, the proportions of silica to alumina and alkali metal oxide to silica, the crystallization period, etc., to obtain the desired product.

The zeolite which will be most preferred in the present invention is the synthetic faujasite variety, wherein X in the above formula is about 2.5 to 7, preferably 3 to 6, most preferably 4 to 5.5. It will usually have an average pore diameter of about 6 to 15, e.g., 7 to 13, A. A conventional scheme for preparing synthetic sodium faujasite is as follows:

Colloidal silica or silica hydrosol is mixed with a solution of sodium hydroxide and sodium aluminate at ambient temperature. Suitable reactant molar ratios fall within the following ranges: $Na_2O/SiO_2$, 0.28 to 0.80; $SiO_2/Al_2O_3$, 4 to 40; $H_2O/Na_2O$, 15 to 60. The reaction mixture is preferably allowed to digest at ambient temperature for up to 40 hours or more, preferably 1 to 15 hours, or cooled to below about 80° F., in order to aid crystallization, and then heated to and held at about 180° to 250° F., e.g. 200° to 220° F., for a sufficient period to crystallize the product and to achieve maximum crystallinity, e.g. 24 to 200 hours or more, typically 50 to 100 hours. A crystalline hydrated sodium alumino-silicate zeolite having a faujasite structure is then separated from the aqueous mother liquor by decantation or filtration, washed, and dried to recover a crystalline product. It is then calcined at temperatures up to about 1000° F. in order to remove the water of hydration and thereby form the interstitial channels which confer adsorptive and catalytic properties.

As indicated, for application as a catalyst, the crystalline alumino-silicate zeolite is subjected to exchange with a metal cation or a hydrogen ion or a hydrogen-containing cation capable of conversion to a hydrogen ion, or mixtures thereof, so as to reduce the zeolitic alkali metal content, e.g. sodium and/or potassium content, to less than about 10 wt. percent (as $Na_2O$), preferably less than about 6 wt. percent ($Na_2O$) and most preferably to a content in the range between about 1–5 wt. percent ($Na_2O$) based on the zeolite crystals. The metal cation suitable for ion exchange can be any cation of a metal of Groups I–B to VIII of the Periodic Table including the rare earth metals, but preferably is a polyvalent member of a group selected from Groups II, III, IV, V, VI–B, VII–B, VIII, the rare earth metals and mixtures thereof. Examples of metal cations suitable for use in ion exchanging are the following: aluminum; alkaline earth metals such as calcium, barium, etc.; magnesium; cadmium; rare earth metals, such as cerium, praseodymium, lanthanum, neodymium, and samarium; chromium; tungsten; cobalt; copper; iron; lead; manganese; nickel; silver; strontium; zinc; tin; molybdenum; vanadium; rhodium; zirconium, etc. Similarly, the alkali metal alumino-silicate can be converted to the hydrogen or acid form in which hydrogen ions occupy the former sites of the alkali metal cations. This may be effected by ion exchange with a hydrogen-containing cation such as, for example, a hydrogen cation or an ammonium cation. The ammonium-exchanged zeolite can be heated to expel ammonia and leave thereby a hydrogen cation in the exchanged site. When employing the zeolite catalyst for the hydrocracking of hydrocarbons, it is generally preferred to exchange the alkali metal cations with alkaline earth metal cations, particularly magnesium or calcium, zinc, aluminum, hydrogen-containing cations and mixtures thereof.

The aforementioned ion exchange is effected by treatment of the zeolite with a suitable salt solution of the aforementioned metal or the hydrogen or hydrogen-containing cation at suitable temperature, e.g. 60° to 170° F. Suitable salt solutions useful in the ion exchange treatment include the sulfates, nitrates, chlorides, bromides, iodides, carbonates, thiocyanates, dithiocarbonates, acetates, benzoates, fluorides, etc., of the aforementioned metals. The exchange solutions can contain a salt of a single metal, or mixtures of the above cations, or mixtures of the metallic cations with other type cations, such as the non-metallic hydrogen ions or ammonium ions. Non-limiting examples of some particularly desirable salt solutions are magnesium sulfate, calcium chloride, barium chloride, iron sulfate, silver nitrate, ammonium chloride, ammonium sulfate, ammonium hydroxide, ammonium nitrate, etc.

The catalytic metal to be deposited on the crystalline zeolite can be any of the well known catalytic metals customarily employed in organic conversion processes, particularly hydrocarbon conversion processes. Such metals, for example, will include platinum, palladium, iridium, rhodium, iron, cobalt, nickel, manganese, tungsten, titanium, zirconium, vanadium, hafnium, zinc, cadmium, tin, lead, aluminum, chromium, molybdenum, ruthenium, osmium, silver, gold, etc. Preferred metals will be the Group VIII metals, with platinum group metals, e.g. platinum and palladium, being especially preferred. The catalytic metal should be in a form which is readily reactive with the gas used to deposit the metal on the zeolite, so that it will be consumed at the end of the deposition period and will not have to be separated from the zeolite particles. The most convenient form of the catalytic metal will be its elemental form. For example, when the catalytic metal is palladium or platinum, the most convenient form will be palladium or platinum black. When the metal is cobalt, nickel, titanium or iron, etc., a convenient form will be a 0.1 to 10 micron reduced powder. However, the catalytic metal may be utilized in other forms, such as finely divided metallic salts; e.g. nitrates, chlorides, sulfates, etc. or organometallics; e.g. nickel, cobalt and iron cyclopentadienyls, trimethylplatinum nitrate, α-naphthylcobalt tri-iodide, etc., the only requirement being that no undesirable residue remain after reaction of the gas with the catalytic metal or metal compound.

The amount of catalytic metal admixed with the zeolite should be just equal to the amount desired to be deposited thereon. This amount will vary with the intended catalytic use of the zeolite. Typical values will be 0.1 to 10, preferably 0.5 to 5, wt. percent based on zeolite.

The gas which is passed through and over the admixture of crystalline zeolite and catalytic metal should be reactable with the catalytic metal at the temperature employed and capable of forming a compound which can be readily adsorbed by the crystalline zeolite at said temperature. As another limitation, the compound formed by the reaction of the gas and the catalytic metal should be one that can be readily reduced back to elemental metal when subjected to a reducing atmosphere. Typical examples of suitable gases include carbon monoxide (to form metal carbonyls); elemental halogens (to form metal halides); carbon monoxide plus halogen, e.g. chlorine (to form metal carbonyl halides); tetrahalides, e.g. vaporous carbon tetrachloride; hydrogen sulfide (to form metal sulfides); etc.

Of the above gases, elemental halogens are preferred in the present process, with chlorine being particularly preferred. The reactable gas which forms the metal compound adsorbed by the crystalline zeolite may be introduced in a relatively pure state, but more preferably is introduced together with an inert carrier gas. Preferably, the carrier gas will comprise air or nitrogen, which will preferably contain a minor amount of the reactive gas. Where the reactive gas is chlorine, the carrier gas will preferably contain about 0.1 to 50 vol. percent, preferably 0.5 to 10 vol. percent, most preferably 1 to 5 vol. percent, of chlorine. The rate at which the gas contacts the zeolite-metal mixture is not critical, the only limitations being that a fast enough rate should be employed to cause a reasonable deposition time.

The elevated temperature at which the admixture of catalytic metal and crystalline zeolite is contacted with the reactable gas is to be regarded as critical, owing to the fact that too high a temperature will cause the deposited metal compound to be transpired from the zeolite and therefore lost to the vapor phase, and too low a temperature will not promote or will markedly reduce the rate of the reaction between the reactable gas and the catalytic metal, and/or will not promote the desired degree of adsorption of the resulting catalytic metal compound. The temperature utilized will, of course, be interrelated with the concentration of the reactable gas, both of which variables should be adjusted to ensure optimum reaction between the reactable gas and the catalytic metal and optimum adsorption of the catalytic metal compound by the crystalline zeolite. With the preferred reactable gas being chlorine utilized in the aforementioned concentrations, and with the preferred catalytic metal being palladium, the preferred temperature range will be about 750° to 1100° F., and preferably about 800 to 1050° F., more preferably about 900 to 1050° F.

The contacting of the reactable gas with the mixture of catalytic metal and crystalline zeolite is continued for a sufficient period of time to entirely consume the catalytic metal particles by conversion to the catalytic metal compound which is adsorbed by the crystalline zeolite. After the reaction and essentially simultaneous deposition, the crystalline zeolite containing adsorbed catalytic metal compound is subjected to a reducing atmosphere, which is preferably a stream of hydrogen gas, at elevated temperatures, e.g. 300 to 1000° F., to thereby reduce the catalytic metal compound to elemental metal. Where the catalytic metal compound is the preferred palladium chloride, passage of a hydrogen stream over the zeolite at about 400 to 800° F. will be suitable.

The invention will be further understood by the following illustrative examples.

*Example 1*

A dehydrated crystalline alumino-silicate zeolite having a silica to alumina mole ratio of about 5.2, uniform pore openings of about 7.5 A., and a crystal structure essentially similar to the natural mineral faujasite, was converted to an ammonium form by ion exchange with an ammonium salt solution. The ammonium form was converted to the hydrogen form by heating at about 950° F. to expel ammonia. The crystalline zeolite after ion exchange treatment contained about 1.5 wt. percent sodium as $Na_2O$, as compared to an initial sodium content of about 9.0 wt. percent as $Na_2O$, the reduction in sodium content having been accomplished by the base exchange procedure. This ammonium form of crystalline zeolite was then dry mixed (in a Patterson-Kelley blender) with 2 wt. percent palladium black. Mixing was continued until a fairly homogeneous mixture was obtained. The thoroughly mixed material was placed in a microporous fritt vycor reactor, and then treated for 16 hours at 1000° F. and atmospheric pressure with a gas stream of 98 vol. percent nitrogen and 2 vol. percent chlorine at a rate of 250 volumes of gas per volume of catalyst per hour. This treatment was continued until the palladium black had disappeared and become deposited as palladium chloride on the zeolite, which took about 16 hours. The catalyst was then treated with a hydrogen stream for 1 hour at 700° F. with a hydrogen flow rate of 250 v./v./hr., which reduced the adsorbed palladium chloride to elemental palladium as indicated by a color change from light yellow to dark gray. The resultant product, which is a highly effective hydrocracking catalyst, had a palladium content by analysis of 2 wt. percent.

*Example 2*

Example 1 was repeated exactly except that the temperature at which chlorine treatment was performed was varied.

At 1200° F., only 0.3 wt. percent palladium was deposited on the zeolite, the balance (1.7 wt. percent) being lost to the vapor phase and recovered in a condensing section of the reactor.

At 700° F., only 20% of the palladium (.4 wt. percent) was deposited on the zeolite after 16 hours, the balance remaining as palladium black.

At 750° F., the total time required to deposit the 2 wt. percent palladium was 88 hours, which is excessively long compared to Example 1.

What is claimed is:

1. A method of preparing a catalyst comprising a crystalline aluminosilicate zeolite having uniform pore openings and a catalytic metal which method comprises dry mixing said zeolite and a solid metal catalyst selected from the class consisting of the elemental form and compounds of catalytic metals, contacting the resulting admixture with a gaseous material reactable with said metal catalyst, said gaseous material being selected from the group consisting of carbon monoxide, elemental halogen, mixtures of carbon monoxide and halogen, carbon tetrahalide and hydrogen sulfide to form a vaporous compound of said metal catalyst which vaporous compound is adsorbed in the exposed surfaces in the pore openings in said zeolite, and subsequently treating said zeolite containing adsorbed metal catalyst in a reducing atmosphere whereby said vaporous compound is reduced to the elemental form of said metal catalyst.

2. The method of claim 1, wherein the amount of catalytic metal is equal to the amount desired to be deposited on said zeolite.

3. The method of claim 1, wherein said zeolite has a crystal structure similar to the mineral faujasite.

4. The method of claim 3, wherein said zeolite has a silica-to-alumina mole ratio of about 3 to 6 and an average pore diameter of about 6 to 15 Angstrom units.

5. The method of claim 3, wherein the sodium oxide content of said zeolite is less than about 10 wt. percent.

6. The method of claim 5, wherein said sodium oxide content is reduced by base exchange of said zeolite with a cation selected from the group consisting of hydrogen-containing cations and metal cations.

7. The method of claim 1, wherein said catalytic metal is a Group VIII metal.

8. The method of claim 1, wherein said metal is a platinum group metal.

9. The method of claim 8, wherein said gaseous material contains halogen.

10. The method of claim 9, wherein said halogen is chlorine.

11. The method of claim 1, wherein said contact is performed at elevated temperature.

12. A method of preparing a catalyst comprising a crystalline aluminosilicate zeolite having uniform pore openings and a platinum group metal which method comprises dry mixing said zeolite and a solid plantinum group metal catalyst selected from the class consisting of the elemental form and compounds of the platinum group metals, contacting the resulting admixture with a gaseous material reactable with said platinum group metal, said gaseous material being selected from the group consisting of carbon monoxide, elemental halogen, mixtures of carbon monoxide and halogen, carbon tetrahalide and hydrogen sulfide, to form a vaporous compound of said platinum group metal which vaporous compound is adsorbed in the exposed surfaces in the pore openings in said zeolite, and subsequently treating said zeolite containing adsorbed platinum group metal catalyst in a reducing atmosphere whereby said vaporous compound is reduced to the elemental form of said platinum group metal.

13. The method of claim 12, wherein said gaesous material contains halogen.

14. The method of claim 12, wherein said gaseous material is elemental chlorine.

15. The method of claim 14, wherein said platinum group metal is palladium.

16. The method of claim 15, wherein the contact between chlorine and said admixture is performed at a temperature within the range of about 750 to 1100° F.

17. The method of claim 16, wherein said temperature is within the range of about 800 to 1050° F.

18. The method of claim 12, wherein said reducing atmosphere contains hydrogen.

19. A method of preparing a crystalline alumino-silicate zeolite catalyst containing palladium which comprises dry mixing said zeolite and a solid form of elemental palladium, contacting the resulting mixture with a chlorine containing gas at a temperature in the range from about 900 to about 1050° F., continuing said contact with said chlorine containing gas until the palladium has become consumed and deposited in the exposed surfaces in the pore openings in said zeolite, and thereafter treating said zeolite containing adsorbed palladium compound with hydrogen to yield elemental palladium at said surfaces.

References Cited

UNITED STATES PATENTS

| | | | |
|---|---|---|---|
| 2,005,412 | 6/1935 | Connolly et al. | 23—175 |
| 2,370,788 | 3/1945 | Gilbert | 252—442 X |
| 2,658,028 | 11/1953 | Haensel et al. | 208—138 X |
| 2,798,051 | 7/1957 | Bicek | 252—466 |
| 2,818,394 | 12/1957 | Haensel et al. | 252—466 |
| 2,971,904 | 2/1961 | Gladrow et al. | 252—455 X |
| 2,983,690 | 5/1961 | Bertolacini | 252—463 X |
| 3,013,987 | 12/1961 | Castor et al. | 252—455 |

DANIEL E. WYMAN, *Primary Examiner.*

C. F. DEES, *Assistant Examiner.*